United States Patent
Appleboum et al.

(10) Patent No.: US 11,210,399 B2
(45) Date of Patent: Dec. 28, 2021

(54) SYSTEM, METHOD AND COMPUTER PROGRAM PRODUCT FOR PROTECTING A COMPUTER SYSTEM FROM ATTACKS

(71) Applicant: CYBER SEPIO SYSTEMS LTD, Tel Aviv (IL)

(72) Inventors: Yosef Appleboum, Potomac, MD (US); Iftah Bratspiess, Tel Aviv (IL); Bentsi Ben-Atar, Ness Ziona (IL)

(73) Assignee: CYBER SEPIO SYSTEMS LTD, Tel-Aviv (IL)

( * ) Notice: Subject to any disclaimer, the term of this patent is extended or adjusted under 35 U.S.C. 154(b) by 270 days.

(21) Appl. No.: 16/078,052

(22) PCT Filed: Mar. 13, 2017

(86) PCT No.: PCT/IL2017/050316
§ 371 (c)(1),
(2) Date: Aug. 21, 2018

(87) PCT Pub. No.: WO2017/158593
PCT Pub. Date: Sep. 21, 2017

(65) Prior Publication Data
US 2019/0042749 A1 Feb. 7, 2019

(30) Foreign Application Priority Data

Mar. 13, 2016 (IL) .......................... 244557

(51) Int. Cl.
*G06F 21/56* (2013.01)
*G06F 1/26* (2006.01)
(Continued)

(52) U.S. Cl.
CPC .............. *G06F 21/567* (2013.01); *G06F 1/26* (2013.01); *G06F 11/3062* (2013.01);
(Continued)

(58) Field of Classification Search
CPC ...... G06F 21/567; G06F 1/26; G06F 11/3062; G06F 13/385; G06F 21/552;
(Continued)

(56) References Cited

U.S. PATENT DOCUMENTS 7,899,753 B1 * 3/2011 Everhart ................ G06Q 99/00
705/67
8,230,149 B1 7/2012 Long et al.
(Continued)

FOREIGN PATENT DOCUMENTS

WO 2017/046789 A1 3/2017
WO 2017/158593 A1 9/2017

OTHER PUBLICATIONS

"USB in a Nutshell;" Chapter 1—Making sense of the USB standard; Jul. 4, 2017; pp. 1-5; https://www.beyondlogic.org/usbnutshell/usb1.shtml.
(Continued)

*Primary Examiner* — Abu S Sholeman
(74) *Attorney, Agent, or Firm* — Oliff PLC

(57) ABSTRACT

A system for protecting a computer system interfacing with peripheral elements via a generic port associated with an open standard interface, the system comprising at least one protection device configured for installation between the computer system and its peripheral element/s and including a pair of computer-peripheral interfaces and a uni-directional data flow limiter (e.g. Uni-directional buffer) intermediate the computer-peripheral interfaces.

20 Claims, 8 Drawing Sheets

(51) Int. Cl.

| | | |
|---|---|---|
| *G06F 11/30* | (2006.01) | |
| *G06F 13/38* | (2006.01) | |
| *G06F 21/55* | (2013.01) | |
| *G06F 21/85* | (2013.01) | |
| *H04L 29/06* | (2006.01) | |
| *H04L 29/08* | (2006.01) | |

(52) U.S. Cl.
CPC .......... *G06F 13/385* (2013.01); *G06F 21/552* (2013.01); *G06F 21/554* (2013.01); *G06F 21/566* (2013.01); *G06F 21/85* (2013.01); *H04L 63/0428* (2013.01); *H04L 63/1425* (2013.01); *H04L 63/1441* (2013.01); *H04L 67/303* (2013.01); *G06F 2213/0042* (2013.01)

(58) Field of Classification Search
CPC ...... G06F 21/554; G06F 21/566; G06F 21/85; G06F 2213/0042; G06F 21/577; G06F 11/3692; G06F 11/3684; G06F 11/3688; G06F 21/73; H04L 63/0428; H04L 63/1425; H04L 63/1441; H04L 67/303
See application file for complete search history.

(56) References Cited

U.S. PATENT DOCUMENTS

| | | | | |
|---|---|---|---|---|
| 8,745,755 | B2* | 6/2014 | Borzycki | H04L 67/34 726/27 |
| 9,104,889 | B1* | 8/2015 | Kiswani | H04W 12/04 |
| 10,078,125 | B2* | 9/2018 | Newman | G01S 1/68 |
| 2001/0032295 | A1* | 10/2001 | Tsai | G06F 13/4243 711/118 |
| 2002/0034273 | A1* | 3/2002 | Spence | G06F 5/06 375/354 |
| 2002/0141332 | A1* | 10/2002 | Barnard | H04J 3/1617 370/218 |
| 2003/0172318 | A1* | 9/2003 | Sugita | G06F 1/266 714/25 |
| 2004/0044807 | A1* | 3/2004 | Wang | G06F 13/4027 710/5 |
| 2005/0114697 | A1 | 5/2005 | Cornell et al. | |
| 2006/0242424 | A1 | 10/2006 | Kitchens et al. | |
| 2007/0006282 | A1* | 1/2007 | Durham | H04L 9/3234 726/2 |
| 2009/0002085 | A1 | 1/2009 | Tarng et al. | |
| 2009/0161924 | A1* | 6/2009 | Lu | G06K 9/00006 382/124 |
| 2010/0268053 | A1* | 10/2010 | Ghesquiere | A61B 5/14532 600/365 |
| 2011/0173315 | A1 | 7/2011 | Aguren | |
| 2011/0302397 | A1* | 12/2011 | Mitola, III | G06F 9/524 712/241 |
| 2012/0151102 | A1* | 6/2012 | Cheng | G06F 13/102 710/19 |
| 2012/0311207 | A1 | 12/2012 | Powers et al. | |
| 2013/0031629 | A1* | 1/2013 | Srivastava | G06F 21/85 726/22 |
| 2013/0318607 | A1 | 11/2013 | Reed et al. | |
| 2013/0347103 | A1 | 12/2013 | Veteikis et al. | |
| 2014/0108792 | A1* | 4/2014 | Borzycki | H04L 67/32 713/165 |
| 2014/0215637 | A1 | 7/2014 | Moore et al. | |
| 2014/0337558 | A1 | 11/2014 | Powers et al. | |
| 2015/0302377 | A1* | 10/2015 | Sweitzer | G06F 3/0484 705/17 |
| 2015/0365237 | A1 | 12/2015 | Soffer | |
| 2016/0080195 | A1* | 3/2016 | Ramachandran | H04L 45/38 370/220 |
| 2016/0094574 | A1* | 3/2016 | Hsueh | G06N 7/005 726/23 |
| 2016/0349308 | A1* | 12/2016 | Zhang | G01R 31/68 |
| 2016/0373408 | A1 | 12/2016 | Wentworth et al. | |

OTHER PUBLICATIONS

"Payloads;" May 2, 2019; pp. 1-3; https://github.com/hak5darren/USB-Rubber-Ducky/wiki/Payloads.

Nitroz; "How to: Using Cisco Cable Diagnostics;" Jan. 28, 2013; pp. 1-4; https://community.spiceworks.com/how_to/24277-using-cisco-cable-diagnostics.

"General Documentation for Ethernet PHY registers;" Microchip; Mar. 10, 2017; pp. 1-3; http://www.microchip.com/forums/m979258.aspx.

"NetXtreme® / NetLink™ BCM5718 Family Programmer's Guide;" Broadcom Corporation; Jul. 17, 2013; pp. 1-602; https://docs.broadcom.com/docs/1211168564147.

Margaret Rouse; "network access control (NAC);" SearchNetworking; Aug. 15, 2017; pp. 1-5; http://searchnetworking.techtarget.com/definition/network-access-control.

Ralf Nuehaus; "A Beginner's Guide to Ethernet 802.3;" Engineer-to-Engineer Note; EE-269; Jun. 6, 2005; pp. 1-26; http://www.analog.com/media/en/technical-documentation/application-notes/EE-269.pdf.

"Autonegotiation;" Wikipedia; Aug. 30, 2017; pp. 1-3; https://en.wikipedia.org/wiki/Autonegotiation.

"Media-independent interface;" Wikipedia; Aug. 4, 2017; pp. 1-7; https://en.wikipedia.org/wiki/Media-independent_interface.

"Anomaly detection;" Wikipedia; Jul. 7, 2017; pp. 1-5; https://en.wikipedia.org/wiki/Anomaly_detection.

Zimek et al.; "Outlier Detection;" Encyclopedia of Database Systems; Springer Science+Business Media LLC; New York; 2017; pp. 1-5.

Hodge et al.; "A Survey of Outlier Detection Methodologies;" Artificial Intelligence Review, 22 (2); 2004; pp. 85-126.

Dokas et al.; "Data Mining for Network Intrusion Detection;" In Proc. NSF Workshop on Next Generation Data Mining; Computer Science Department; University of Minnesota; Nov. 2002; pp. 21-30.

Dargin; "Increase your network security: Deploy a honeypot;" NetworkWorld; Oct. 24, 2017; pp. 1-8; https://www.networkworld.com/article/3234692/increase-your-network-security-deploy-a-honeypot.html.

"A New Way to Look at Network Access Control;" Jul. 4, 2017; pp. 1-4; https://www.forescout.com/solutions/network-access-control/.

Aug. 16, 2018 "Cisco Identity Services Engine;" pp. 1-9; https://www.cisco.com/c/en/us/products/security/identity-services-engine/index.html.

* cited by examiner

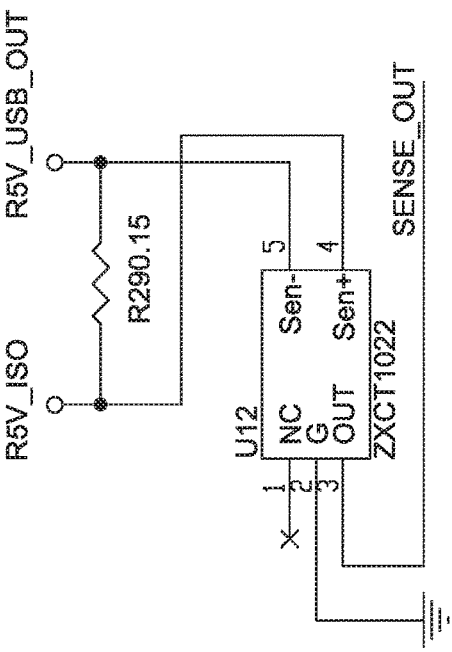
Figure 10
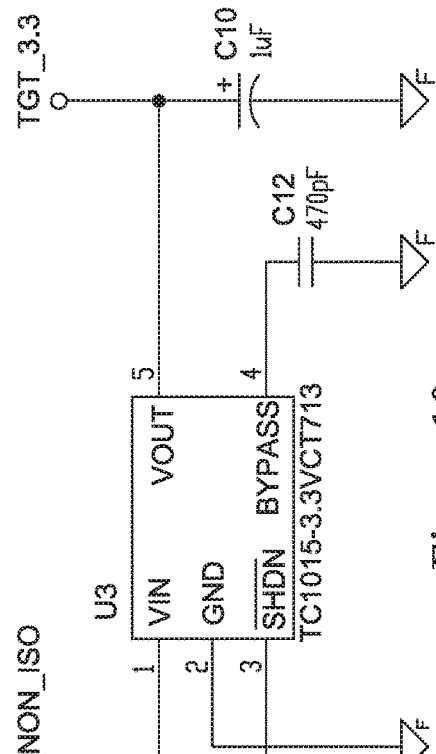
Figure 11a
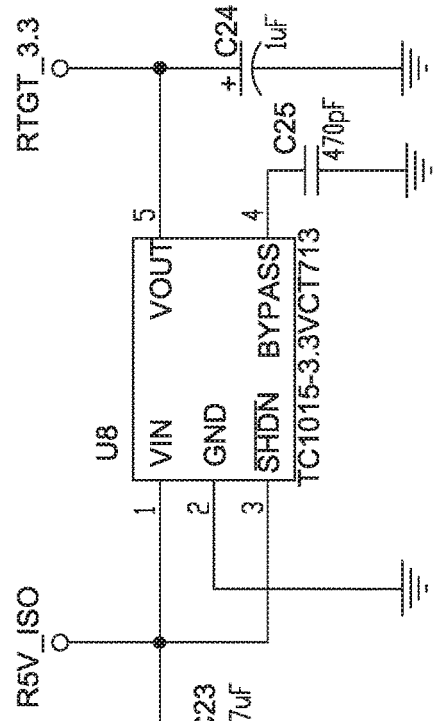
Figure 11b
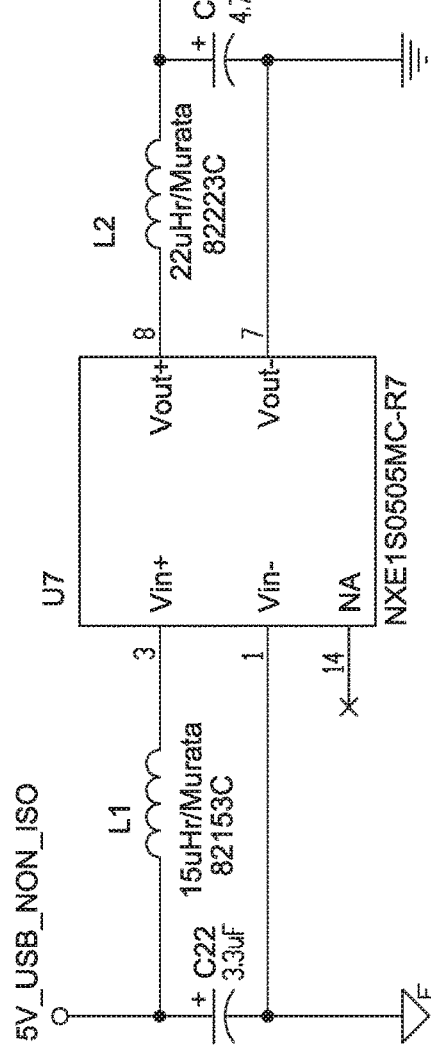

SYSTEM, METHOD AND COMPUTER PROGRAM PRODUCT FOR PROTECTING A COMPUTER SYSTEM FROM ATTACKS

REFERENCE TO APPLICATIONS

Priority is claimed from Israeli Patent Application No. 244557 entitled "A system and method for protecting a computer system from USB related vulnerabilities e.g. cyber attacks", and filed 13 Mar. 2016, the disclosure of which application is hereby incorporated by reference.

FIELD OF THIS DISCLOSURE

The present invention relates generally to computer systems and more particularly to computer systems interfacing with peripherals e.g. via a USB connection.

BACKGROUND FOR THIS DISCLOSURE

Almost all computer systems, and processor-embedded peripherals such as but not limited to communication devices, printers, storage appliances and more, use a USB (Universal Serial Bus) as the main interface for connecting peripheral hardware.

A typical server, desktop computer, or laptop will usually have 4 to 6 USB ports that are mostly used for connecting HID products (Human interface Device) such as a mouse and keyboard, removable media/storage (Disk on Key for example), and other local peripheral hardware devices such as printers, audio input/output/record/playback devices, cameras, scanners etc.

"Optical" air-gaps are known e.g. the airgap solution described at the following http link: waterfall-security.com/products/unidirectional-security-gateways, which is used for supervisory control and data acquisition (scada) security applications.

The disclosures of all publications and patent documents mentioned in the specification, and of the publications and patent documents cited therein directly or indirectly, are hereby incorporated by reference.

SUMMARY OF CERTAIN EMBODIMENTS

Being widely used, very generic and an open standard, a USB is heavily targeted as a weak point when trying to attack computer systems.

Since a USB can be used to interface practically anything to a computer system, with unlimited ability to "inject" data into the computer and "export" data from the computer, an attack on the system may include a mechanism used to take over the computer system, steal information, cause damage, or even allow the computer system to be used as a zombie for further attacking more networks and devices.

USB attacks can take place not only at the personal computer, home, or office use level, but also against entire enterprises, critical infrastructures, or retail environments.

A typical POS (Point of Sale) deployment such as a supermarket or retail chain store will include several active USB connections—for example a keyboard, a barcode scanner, a label printer etc. Each of these can be used for exploiting the system and installation.

USB attacks can start as early as before hitting the site or being installed (e.g. supply chain attacks) or at any later stage e.g. by infecting the existing USB device via the computer or the network.

USB is a combined hardware and software specification and is therefore subject to attacks on both hardware and/or software levels e.g. where an attacker "transplants" additional hardware functionality into an innocent peripheral device, and/or when the attacker, alternatively, or in addition, adds a hostile piece of code (malware) into the peripheral device code, and then uses the compromised peripheral device to compromise the computer system.

A typical hardware implant scenario is adding wireless transmission capabilities in a mouse or a keyboard, and practically gaining access to the computer system or being able to transmit sensitive information from the computer (ex-filtrate), without the user being aware that any change has taken place.

A firmware/software attack scenario could include adding the ability of acting as a storage device to an input device, such as a barcode reader, and using the input device to transfer files into the computer, including perhaps infecting the computer with a virus that will steal all credit card information and transmit them at a later time.

Certain embodiments of the present invention seek to prevent a system method and/or computer program product for protecting a computer system from USB related vulnerabilities, e.g. cyber attacks.

Certain embodiments of the present invention seek to prevent data leakage from a secured side of a of computer-peripheral communication scenario, by preventing data from propagating in the "opposite" direction i.e. the peripheral-inward direction for peripheral output devices or the peripheral-outward direction for peripheral input devices.

Certain embodiments of the present invention seek to determine or verify that a USB device is an authentic device (i.e. it is an input peripheral, or is an output peripheral e.g.), and to restrict its functionality accordingly e.g. by providing uni-directional data flow to suit the input or output character of the peripheral.

Certain embodiments of the present invention seek to provide processing circuitry comprising at least one processor in communication with at least one memory, with instructions stored in such memory executed by the processor to provide functionalities which are described herein in detail.

The present invention typically includes at least the following embodiments:

Embodiment 1. A system for protecting a Computer System interfacing with peripheral elements via a generic port associated with an open standard interface, the system comprising:

at least one Protection Device configured for installation between the Computer System and its Peripheral element/s and including:

a pair of computer-peripheral interfaces (aka "near end" interface and "far-end" interface); and a uni-directional data flow limiter uni-directional buffer) intermediate the computer-peripheral interfaces.

Embodiment 2. A system according to any of the preceding embodiments. and also comprising a first CPU configured to interface with the "near end" interface and to act as a virtual peripheral element.

Embodiment 3. A system according to any of the preceding embodiments.

and also comprising a second CPU configured to interface with the "far-end" USB interfaces and to act as a virtual computer system.

Embodiment 4. A system according to any of the preceding embodiments and also comprising first and second CPUs configured to interface with the "near end" interface and "far-end" USB interfaces respectively and to act as a virtual peripheral element and a virtual computer system, respectively, and wherein the uni-directional data flow limiter is disposed intermediate the first and second CPUs.

Embodiment 5. A system according to any of the preceding embodiments wherein authentication firmware resides on the first CPU.

Embodiment 6. A system according to any of the preceding embodiments wherein security tunnel firmware resides on the first CPU.

Embodiment 7. A system according to any of the preceding embodiments and also comprising a dedicated power supply that feeds at least one peripheral element and is monitored to provide an indication for at least one manipulated device/attack.

Embodiment 8. A system according to any of the preceding embodiments and also comprising behavioral analysis functionality configured to receive data flowing between computer and peripheral and to provide an indication for at least one manipulated device/attack.

Embodiment 9. A system according to any of the preceding embodiments wherein the hardware based uni-directional data flow limiter is permanently configured to invoke only one of two states each ensuring that data flows only in one direction, i.e. either only out or only in.

Embodiment 10. A system according to any of the preceding embodiments wherein the hardware based uni-directional data flow limiter invokes an input only state and is used in conjunction with a USB port, thereby to protect the computer system against data leakage, while an input oriented peripheral is communicating with the USB port.

Embodiment 11. A system according to any of the preceding embodiments wherein the hardware based uni-directional data flow limiter invokes an Output Only state and is used in conjunction with a USB port exporting data from the computer thereby to ensure that the computer is detached from any external device or entity that could "push" harmful data or files inwards.

Embodiment 12. A data security system comprising:

functionality operative to detect a profile for each device trying to use a password e.g. hostile or attacking device that can "playback" predefined known keystroke patterns, and to compare the profile to a known e.g. discovered and stored profile for the user who owns the password.

Embodiment 13. A system according to any of the preceding embodiments and wherein the profile comprises a unique user "fingerprint" characterized by the time difference between each character and the next character when the user types her or his password or any other word or sequence of characters.

Embodiment 14. A system according to any of the preceding embodiments wherein the Protection Device is operative to undergo training e.g. using supervised machine learning technology, in which users' profiles are learned, and accordingly, to detect a profile for each device trying to use a password, e.g. hostile or attacking device, that can "playback" predefined known keystroke patterns, and to compare the profile to a known profile for the user who owns the password.

Embodiment 15. A system according to any of the preceding embodiments and wherein the profile comprises a unique user "fingerprint" characterized by the time difference between each character and the next character when the user types her or his password (or almost any other word or sequence of characters).

Embodiment 16. A system according to any of the preceding embodiments wherein, if Authentication Software on the Computer System detects that the Protection Device is not present, the Authentication Software uses management Software on the Computer System to alert at least one of the user and the system administrator.

Embodiment 17. A system according to any of the preceding embodiments wherein, if Authentication Software on the Computer System detects that the Protection Device has been replaced, the Authentication Software uses management Software on the Computer System to alert at least one of the user and the system administrator.

Embodiment 18. A system according to any of the preceding embodiments wherein, if Authentication Software on the Computer System detects that the Protection Device is not present, the Authentication Software uses management Software on the Computer System to automatically disable the port to ensure no infection can come through.

Embodiment 19. A system according to any of the preceding embodiments wherein, if Authentication Software on the Computer System detects that the Protection Device has been replaced, the Authentication Software uses management Software on the Computer System to automatically disable the port to ensure no infection can come through.

Embodiment 20. A system according to any of the preceding embodiments wherein plural host interfaces are used for connecting plural Peripheral Products to the Computer System via the port e.g. via a single port.

Embodiment 21. A system according to any of the preceding embodiments wherein the Protection Device comprises a distributed device with separate near end and far end portions connected by a single optical fiber while maintaining communications uni-directional on the hardware/physical layer.

Embodiment 22. A system according to any of the preceding embodiments wherein the Protection Device is operative to encrypt all data coming from the peripheral device via the Protection Device, so that the data enters the Computer System (aka "local computer system") and is transmitted over the network without being readable and is decrypted only within a remote Computer System that is safe and secured.

Embodiment 23. A system according to any of the preceding embodiments which is deployed in a retail environment such that even if a cash register computer (the local Computer System is compromised e.g. becomes infected, or the network is hacked or tampered with, credit card data cannot be stolen because the credit card data is present within the compromised Computer System or network, only in encrypted form.

Embodiment 24. A system according to any of the preceding embodiments and wherein the hardware based uni-directional data flow limiter is implemented in hardware e.g. comprises a uni-directional data buffer.

Embodiment 25. A system according to any of the preceding embodiments wherein the Protection Device is configured for installation between the Computer System and its Peripheral element/s via a generic port associated with a computer-peripheral interface e.g. open e.g. standard e.g. USB.

Embodiment 26. A data security method comprising:

Providing a pair of computer-peripheral interfaces with data communication therebetween; and Providing a power supply operative to supply power to a peripheral connected to one of the interfaces; and Monitoring current usage by sampling current drawn from the power supply and to detect abnormal patterns in the peripheral's current usage and, responsively, to disable data communication between the pair of interfaces.

Embodiment 27. A method for protecting a Computer System interfacing with peripheral elements via a generic port associated with an open standard interface, the method comprising:

Providing at least one Protection Device configured for installation between the Computer System and its Peripheral element/s and including:

Providing a pair of computer-peripheral interfaces (aka "near end" interface and "far-end" interface); and Providing a uni-directional data flow limiter (e.g. uni-directional buffer) intermediate the computer-peripheral interfaces.

Embodiment 28. A system according to any of the preceding embodiments which is deployed between a pair of computer-peripheral interfaces.

Embodiment 29. A data security system comprising:

a pair of computer-peripheral interfaces with data communication therebetween; and a power supply operative to supply power to a peripheral connected to one of the interfaces; and apparatus operative to monitor current usage by sampling current drawn from the power supply and to detect abnormal patterns in the peripheral's current usage and, responsively, to disable data communication between the pair of interfaces.

Embodiment 30. A data security method comprising:

Detecting a profile for each device trying to use a password e.g. hostile or attacking device that can "playback" predefined known keystroke patterns, and comparing the profile to a known e.g. discovered and stored profile for the user who owns the password.

Embodiment 31. A computer program product, comprising a non-transitory tangible computer readable medium having computer readable program code embodied therein, the computer readable program code adapted to be executed to implement any of the methods shown and described herein.

Also provided, excluding signals, is a computer program comprising computer program code means for performing any of the methods shown and described herein when the program is run on at least one computer; and a computer program product, comprising a typically non-transitory computer-usable or -readable medium e.g. non-transitory computer-usable or -readable storage medium, typically tangible, having a computer readable program code embodied therein, the computer readable program code adapted to be executed to implement any or all of the methods shown and described herein. The operations in accordance with the teachings herein may be performed by at least one computer specially constructed for the desired purposes or general purpose computer specially configured for the desired purpose by at least one computer program stored in a typically non-transitory computer readable storage medium. The term "non-transitory" is used herein to exclude transitory, propagating signals or waves, but to otherwise include any volatile or non-volatile computer memory technology suitable to the application.

Any suitable processor/s, display and input means may be used to process, display e.g. on a computer screen or other computer output device, store, and accept information such as information used by or generated by any of the methods and apparatus shown and described herein; the above processor/s, display and input means including computer programs, in accordance with some or all of the embodiments of the present invention. Any or all functionalities of the invention shown and described herein, such as but not limited to operations within flowcharts, may be performed by any one or more of: at least one conventional personal computer processor, workstation or other programmable device or computer or electronic computing device or processor, either general-purpose or specifically constructed, used for processing; a computer display screen and/or printer and/or speaker for displaying; machine-readable memory such as optical disks, CDROMs, DVDs, BluRays, magnetic-optical discs or other discs; RAMs, ROMs, EPROMs, EEPROMs, magnetic or optical or other cards, for storing, and keyboard or mouse for accepting. Modules shown and described herein may include any one or combination or plurality of: a server, a data processor, a memory/computer storage, a communication interface, a computer program stored in memory/computer storage.

The term "process" as used above is intended to include any type of computation or manipulation or transformation of data represented as physical, e.g. electronic, phenomena which may occur or reside e.g. within registers and/or memories of at least one computer or processor. The term processor includes a single processing unit or a plurality of distributed or remote such units.

The above devices may communicate via any conventional wired or wireless digital communication means, e.g. via a wired or cellular telephone network or a computer network such as the Internet.

The apparatus of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may, wherever suitable, operate on signals representative of physical objects or substances.

The embodiments referred to above, and other embodiments, are described in detail in the next section.

Any trademark occurring in the text or drawings is the property of its owner and occurs herein merely to explain or illustrate one example of how an embodiment of the invention may be implemented.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing". "classifying", "generating", "producing", "stereo-matching", "registering", "detecting", "associating", "superimposing", "obtaining" or the like, refer to the action and/or processes of at least one computer's or computing system/s, or processor/s or similar electronic computing device/s, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, embedded cores, computing system, communication devices, processors (e.g. digital signal processor (DSP), microcontrollers, field programmable gate array (FPGA), application specific integrated circuit (ASIC), etc.) and other electronic computing devices.

The present invention may be described, merely for clarity, in terms of terminology specific to, or references to, particular programming languages, operating systems, browsers, system versions, individual products, protocols and the like. It will be appreciated that this terminology or such reference/s is intended to convey general principles of operation clearly and briefly, by way of example, and is not intended to limit the scope of the invention solely to a particular programming language, operating system, browser, system version, or individual product or protocol. Nonetheless, the disclosure of the standard or other professional literature defining the programming language, operating system, browser, system version, or individual product or protocol in question, is incorporated by reference herein in its entirety.

Elements separately listed herein need not be distinct components and alternatively may be the same structure. A statement that an element or feature may exist is intended to include (a) embodiments in which the element or feature exists; (b) embodiments in which the element or feature does not exist; and (c) embodiments in which the element or feature exist selectably e.g. a user may configure or select whether the element or feature does or does not exist.

Any suitable input device, such as but not limited to a sensor, may be used to generate or otherwise provide information received by the apparatus and methods shown and described herein. Any suitable output device or display may be used to display or output information generated by the apparatus and methods shown and described herein. Any suitable processor/s may be employed to compute or generate information as described herein and/or to perform functionalities described herein and/or to implement any engine, interface or other system described herein. Any suitable computerized data storage e.g. computer memory may be used to store information received by or generated by the systems shown and described herein. Functionalities shown and described herein may be divided between a server computer and a plurality of client computers. These or any other computerized components shown and described herein may communicate between themselves via a suitable computer network.

BRIEF DESCRIPTION OF THE DRAWINGS

FIG. 10 is a schematic illustration of an example detailed implementation of near-side circuitry included in the (typically dedicated and/or with monitoring capability) power supply of FIG. 5 according to certain embodiments (passive connectors omitted for simplicity).

FIGS. 11*a*-11*b*, taken together, form an example detailed implementation of far-side circuitry included in the (typically dedicated and/or with monitoring capability) power supply of FIG. 5 according to certain embodiments (passive connectors omitted for simplicity).

Figure 1:
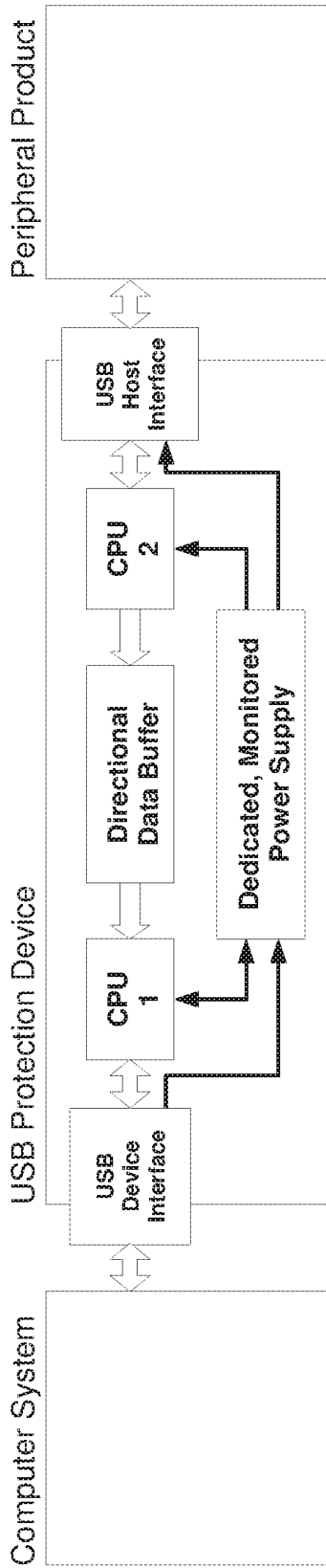
FIG. 1 is a simplified block diagram illustration of a USB Protection Device—Input Only, in accordance with certain embodiments.

Methods and systems included in the scope of the present invention may include some (e.g. any suitable subset) or all of the functional blocks shown in the specifically illustrated implementations by way of example, in any suitable order e.g. as shown.

Computational, functional or logical components described and illustrated herein can be implemented in various forms, for example, as hardware circuits such as but not limited to custom VLSI circuits or gate arrays or programmable hardware devices such as but not limited to FPGAs, or as software program code stored on at least one tangible or intangible computer readable medium and executable by at least one processor, or any suitable combination thereof. A specific functional component may be formed by one particular sequence of software code, or by a plurality of such, which collectively act or behave or act as described herein with reference to the functional component in question. For example, the component may be distributed over several code sequences such as but not limited to objects, procedures, functions, routines and programs and may originate from several computer files which typically operate synergistically.

Each functionality or method herein may be implemented in software, firmware, hardware or any combination thereof. Functionality or operations stipulated as being software-implemented may alternatively be wholly or fully implemented by an equivalent hardware or firmware module and vice-versa. Firmware implementing functionality described herein, if provided, may be held in any suitable memory device and a suitable processing unit (aka processor) may be configured for executing firmware code. Alternatively, certain embodiments described herein may be implemented partly or exclusively in hardware in which case some or all of the variables, parameters, and computations described herein may be in hardware.

Any module or functionality described herein may comprise a suitably configured hardware component or circuitry. Alternatively or in addition, modules or functionality described herein may be performed by a general purpose computer or more generally by a suitable microprocessor, configured in accordance with methods shown and described herein, or any suitable subset, in any suitable order, of the operations included in such methods, or in accordance with methods known in the art. Any functionality mentioned herein may be firmware-implemented or processor-implemented. Any processor or controller may include one or more hardware devices e.g. chips, which may be co-located or remote from one another.

Any logical functionality described herein may be implemented as a real time application, if and as appropriate, and which may employ any suitable architectural option such as but not limited to FPGA, ASIC or DSP or any suitable combination thereof.

Any hardware component mentioned herein may in fact include either one or more hardware devices e.g. chips, which may be co-located or remote from one another.

Any method described herein is intended to include within the scope of the embodiments of the present invention also any software or computer program performing some or all of the method's operations, including a mobile application, platform or operating system e.g. as stored in a medium, as well as combining the computer program with a hardware device to perform some or all of the operations of the method.

Data can be stored on one or more tangible or intangible computer readable media stored at one or more different locations, different network nodes, or different storage devices at a single node or location.

It is appreciated that any computer data storage technology, including any type of storage or memory and any type of computer components and recording media that retain digital data used for computing for an interval of time, and any type of information retention technology, may be used to store the various data provided and employed herein. Suitable computer data storage or information retention apparatus may include apparatus which is primary, secondary, tertiary or off-line which is of any type or level or amount or category of volatility, differentiation, mutability, accessibility, addressability, capacity, performance and energy use; and which is based on any suitable technologies such as semiconductor, magnetic, optical, paper and others.

DETAILED DESCRIPTION OF CERTAIN EMBODIMENTS

An embodiment of the invention includes a dongle or other apparatus, which may implement any of the variations described herein with reference to FIGS. 1-2, 4-7, and which plugs into a port e.g. USB port of a computer (say), which may, or may not be networked. The dongle or other apparatus is operative for monitoring and/or securing the usage of that port, including security of data flowing in and out of the computer from/to a USB (say) device that is attached through the dongle and the port. The dongle is typically constructed and operative to block/disallow (typically in hardware) any forbidden type of communication or information content e.g. as described in detail herein.

Figure 2:
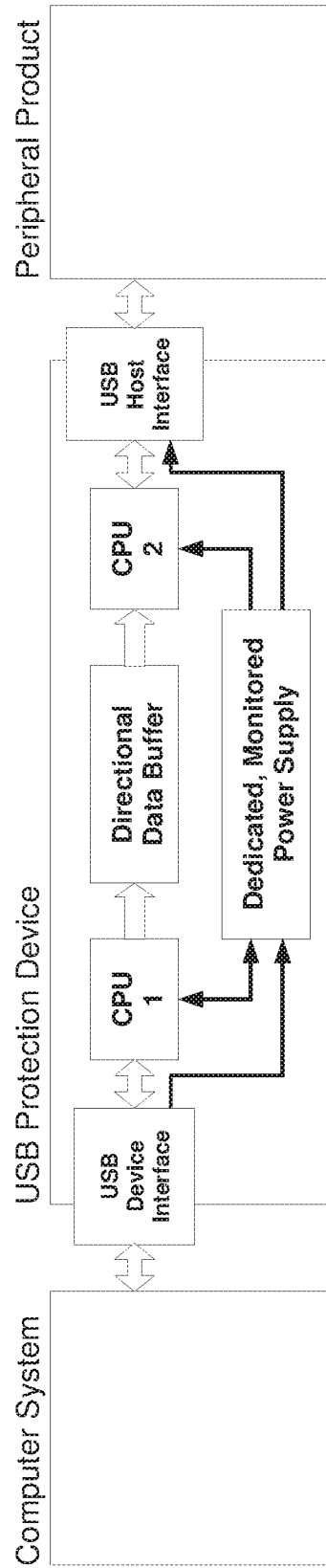
FIG. 2 is a simplified block diagram illustration of a USB Protection Device—Output Only, in accordance with certain embodiments; typically, the end-user will use the embodiment of FIG. 1 for USB ports serving a peripheral which is an input device e.g. keyboard, and will use the embodiment of FIG. 2 when the USB port is serving a peripheral which is an output device e.g. printer.

The dongle may have two variants which respectively implement the embodiments of FIGS. 1, 2 and may be used in conjunction with input peripheral devices and output peripheral devices respectively. Alternatively, the embodiments of FIGS. 1, 2 may be integrated into input peripheral devices and output peripheral devices respectively.

According to certain embodiments, the dongle (or integrated device) includes a unidirectional buffer intermediate a pair of computer-peripheral interfaces e.g. conventional USB interfaces. Thereby, one direction of computer-peripheral communication enabled by conventional USB, is disabled entirely to reduce data leakage options for malicious saboteurs. Alternatively, or in addition, behavioral analysis functionality is provided as shown and described herein, to detect, hence reduce or eliminate data leakage options for malicious saboteurs, even in the remaining, "desired" direction of computer-peripheral communication.

It is appreciated that adding additional functionality to the USB device as described herein typically requires more power or uses the power lines for transmission. Optionally, an associated dedicated power supply and/or functionality for monitoring power drawn by the peripheral, is/are provided e.g. integrally with the apparatus e.g. dongle shown and described herein, to detect, hence reduce or eliminate, data leakage options for malicious saboteurs, even in the remaining, "desired" direction of computer-peripheral communication. It is appreciated that power monitoring circuits are well known and any suitable conventional power monitoring solution may be employed.

According to certain embodiments, the analysis module may communicate with the power monitoring module, e.g. to provide sensing parameters/values used for power usage detection. Optionally, decision-making logic for detecting malevolent peripheral device behavior may receive and combine outputs from both the analysis module and the power monitoring module.

An advantage is foiling attackers' use of a peripheral product or external device (printer, keyboard, flash drive e.g.) that includes an implant (such as wireless transmitter or keylogger) in an attempt to gain access to the network via the computer and/or to sensitive information stored in the computer and/or to infect the computer and/or network with malware.

Typically, the solution shown and described herein includes integrated hardware/firmware rather than merely software. For example, typically, air gap protection is achieved by using hardware, although firmware or software are also possible, and all other features are either firmware or software as suited to a particular use-case or designer's choice.

Certain embodiments of the invention incorporate a hardware device typically with specific firmware and/or software in order to provide protection against such attacks.

Certain embodiments of the invention include a dedicated hardware circuit (Directional Data Buffer) configured to physically ensure that information can pass only in one direction and never in the opposite direction. This protection need not necessarily be implemented as a specific mechanism at the hardware/physical level, although that design choice has the advantage of making the solution robust against software bugs or infections that could compromise the data flow limiter's (e.g. unidirectional buffer's) functionality.

As the Directional Data Buffer lets information pass only in one direction, whereas existing computer systems and peripheral products are configured and designed to "expect" two way bidirectional communication between them, suitable firmware may be provided on either side of the directional limiter e.g. buffer, which is operative to mimic the normal two-way communication between computer and peripheral. For example, firmware which resides on the internal flash memory of CPU 1 in FIG. 1 may mimic the behavior of a peripheral vis a vis the computer system, whereas firmware which resides on the internal flash memory of CPU 2 in FIG. 1 may mimic the behavior of a computer system vis a vis the peripheral.

It is appreciated that a suitable microcontroller which includes a CPU with internal flash memory may be used to implement the CPU's 1 and 2 in FIGS. 1 and 2.

In the Input-Only variant of FIG. 1, typically, the uni-directional data buffer typically provides data flow only in the peripheral-to-central (far to near) direction.

At the "Far" side the hardware and/or firmware of CPU 2 are configured to act as a virtual Computer System engaged in two way communication with the Peripheral Product.

At the "Near" side the hardware and/or firmware of CPU 1 are typically configured to act as a virtual Peripheral Product engaged in two way communication with the Computer System and makes sure information flowing from the real Peripheral Product (physically connected to CPU 2) is transmitted to the Computer System.

In the Output-Only variant of FIG. 2, the uni-directional data buffer typically provides data flow only in the central-to-peripheral (near to far) direction.

At the "Far" side the hardware and/or firmware of CPU 2 may be configured to act as a virtual Computer System engaged in two way communication with the Peripheral Product. At the "Near" side the hardware and/or firmware of CPU 1 may be configured to act as a virtual Peripheral Product engaged in two way communication with the Computer System and to ensure all information that comes from the real Computer System (physically connected to CPU 1) is transmitted to the Peripheral Product (physically connected to CPU 2).

The term "far" refers to the peripheral "end" of the system whereas the term "near" refers to the central "end" of the system e.g. the computer system and perhaps network via which the computer system communicates with remote peers.

Optionally, each CPU (from among CPU 1, CPU 2) is configured to query the USB-inserted device to which the CPU is adjacent for its feature set, then examines this feature set, and replicates a feature set which includes the minimal functionality required from, or a suitable subset of, that feature set rather than, necessarily, the entire feature set. This may be advantages if, for example, the USB device advertises more features than are really needed. For example a USB-microphone may advertise itself as also being a keyboard input device, e.g. because the USB-microphone's vendor has opted to re-use hardware/firmware between various peripherals. The CPU adjacent this USB-microphone may be configured not to replicate keyboard input device functionality which is not needed for USB-microphone functionality, to reduce risk.

According to certain embodiments, a replicated aka virtual driver is built e.g. by the CPU firmware, to emulate a peripheral input device (say a mouse device) adjacent the CPU. Typically, the virtual driver will be configured to support only reception of position data and button clicks, and not to support other reverse functionality, such as but not limited to STORAGE or AUDIO that might aid an infected mouse or other peripheral in trying to push harmful data inward.

According to certain embodiments, the computer side is protected from malware moving from the printer to the computer side.

One or more software modules that run on the Computer System may be used continuously, periodically or on occasion, to ensure that the USB Protection Device is still plugged into the Computer System, active, authentic, and/or fully functional.

Certain embodiments of the invention may include some or all of the following functional capabilities:

a. The use of a typically hardware based directional data buffer, typically deployed intermediate a pair of device-device interfaces and configured to ensure that data can pass only in one direction and never in the opposite direction e.g. only from computer to peripheral, or only from peripheral to computer, or, more generally, only from electronic device a to electronic device b, or only from b to a.

b. The use of a dedicated and isolated power supply for generating an independent supply voltage for feeding the peripheral product. Isolated power circuits may be advantageous in preventing cases of malevolent data extraction from power plane signals (power and ground), which pick up signals from nearby PCB traces that carry data. Typically, but not necessarily, the power supply is monitored e.g. includes functionality operative to continuously or periodically or on occasion measure the current drawn from that power supply and to alert or discontinue data flow if the current is found to be abnormal.

c. The use of behavioral analytics, aka USB-interface-to-USB-interface data flow analytics, e.g. implemented in software, typically residing intermediate a pair of device-device interfaces and capturing and analyzing data flow between the two interfaces to identify therewithin, anomalies which suggest that the peripheral product is being used for an illegitimate, data security-compromising purpose which differs from the peripheral product's normal and legitimate purpose.

d. combinations thereof, such as a and b, a and c, b and c, and all 3 namely a, b, c combined that act together to enhance security against complex attack scenarios.

Typically, a hardware based Directional Data Buffer is provided that limits the data flow to pass only in one direction. Therefore two separate product variants, as shown in FIGS. 1 and 2, may be provided. Selecting one of the above variants e.g. Input Only or Output Only for each individual product, is typically part of the factory production process. Once produced, the USB Protection Device is typically either an Input Only or an Output Only device, and this may never be altered.

The Input Only device e.g. as shown in FIG. 1, may be used when it is desired to protect the Computer System against data leakage, while an input oriented peripheral is in communication with the computer system's USB port (such as a keyboard or a mouse). The Output Only device e.g. as shown in FIG. 2 is used when it is desired to export data from the computer via its USB port (such as towards a printer, or when exporting log files to an external memory/storage device via its USB port) while keeping the computer absolutely detached from any external device or entity that could "push" harmful data or files inwards.

The USB Protection Device is configured to be installed between the Computer System (or host) that it seeks to secure, and the Peripheral Product.

Without or before using the USB Protection Device, a typical user will connect whichever peripheral products s/he wants to use, directly into the Computer System. An example in an enterprise environment is a workstation of a bank employee that would have a keyboard and mouse directly connected to his desktop computer. Another example, in a retail environment, would be a Point-of-Sale terminal that is based on a dedicated computer system, and Peripheral Products, such as a laser barcode scanner and digital scales.

When securing the deployment, a USB Protection Device would be plugged in between the Computer System and any Peripheral Product and is typically transparent in both directions.

Any suitable technology may be used herein to provide directional data buffering. The USB Protection Device typically includes two "sides" (functional blocks) namely the "Near" side (e.g. CPU 1) and the "Far" side (e.g. CPU 2), and a hardware based directional data buffer in between them.

Towards the Peripheral Product, the USB Protection Device acts as a USB Host, thus emulating a synthetic/virtual Computer System that wishes to use the Peripheral Product. Towards the Computer System, the USB Protection Device acts as a USB Device, thus emulating the Peripheral Product that the Computer System wishes to use.

The Directional Data Buffer converts data coming from the "Far" side (CPU 2) from electrical signals to optical signals, transmits them through the air or another optical coupling medium, and converts them back to electrical signals on the receiving "Near" side (CPU 1). This absolute physical isolation, that may be based on visible light or other electromagnetic radiation e.g. as described herein in detail with reference to the photodiode/photo resistor embodiment of FIG. 3, renders it impossible that any data could flow in the wrong (insecure) direction—neither as a result of a bug or a software problem, nor as a result of emitted electromagnetic radiation or parasitic coupling of electrical signals.

Figure 3:
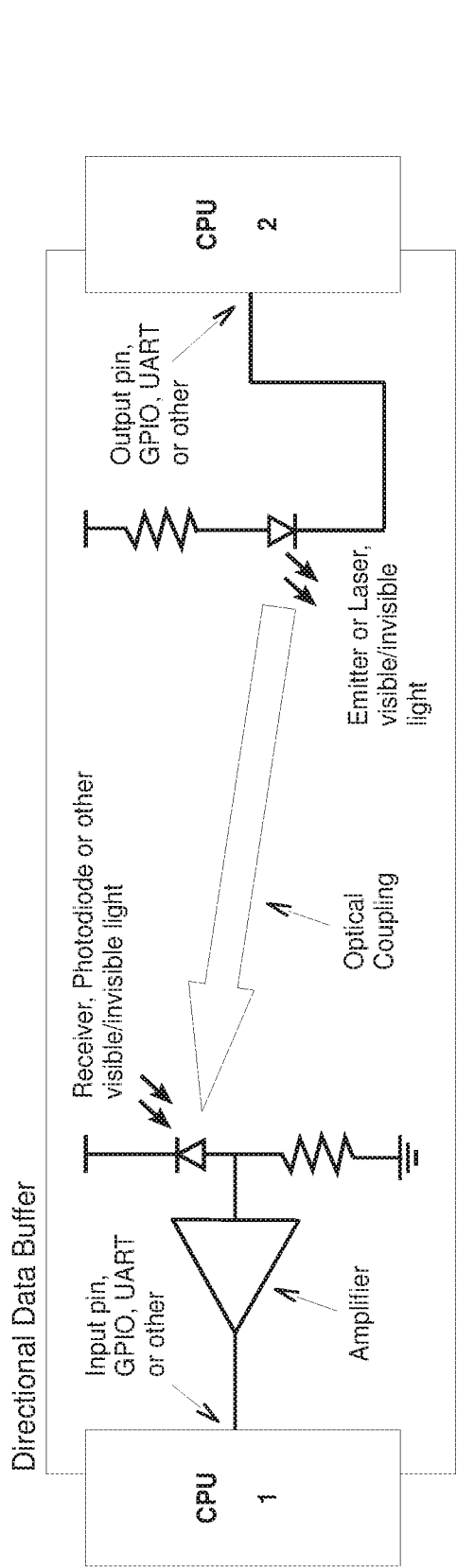
FIG. 3 is a simplified block diagram illustration of a directional (aka "unidirectional") data buffer which is useful inter alia in conjunction with the embodiment of FIG. 1, in accordance with certain embodiments; a variant buffer for use in conjunction with the embodiment of FIG. 2 may replace CPU 1 with CPU 2, and vice versa, in FIG. 3.

An example of a Directional Data Buffer is shown in FIG. 3. It is appreciated that this "optical" embodiment is but one possible implementation. For example, a unidirectional FIFO (ex. CY7C43683) having a single FIFO array may be used operative to transfer data only from Port A to Port B and not vice versa, where Port A is the input-only data bus while port B is the output-only data bus of the uni-directional buffer.

The "Far" side and "Near" side may be based on standard microcontroller or microprocessor environments such as, say, microchip's pic24fjxxgb002 device and may either use integrated USB circuitry on the same chip, or use a peripheral USB controller that is interfaced to the microcontroller/microprocessor.

Firmware of both CPU 1 and CPU 2 may be configured to support or emulate the standard bi-directional USB functionality and protocol stack, and to support whatever host and device profile set is needed in the specific use case e.g. HID (human interface device), mass storage, printer etc. More generally, each USB device includes a descriptor list of functionalities implemented thereby, and typically, the firmware of both CPU 1 and CPU 2 support or emulate all of the functionality found in the USB device's driver list, or some functionality therein e.g. as described herein in detail.

Still with reference to FIG. 3, it is appreciated that other conventional technologies may be employed to achieve an "air-gap" as shown. However, the air-gap achieved in the embodiment of FIG. 3 by using light, rather than, say, copper wires/traces, provides excellent security leakage prevention since physically, there is simply no "path" in the wrong, undesired direction. As shown, a light emitting diode on one side ("tx side") transmits light according to the information that is to be carried, and a light receiving photo-transistor is provided on the other ("rx") side.

It is appreciated that an implementation lacking one or both of the CPUs shown in FIG. 3 is possible e.g. if the buffer connects direct to the two USB interfaces. However, typically, in such an implementation, protection functionality is lost. For example, as in the USB-MIC example described above, in the event of a "direct" conversion, the keyboard functionality will be passed on as well, which does not occur if the CPUs of FIG. 3 are provided.

Typically, a Dedicated Power Supply is provided e.g. as shown and described herein, Normally, USB Peripheral Products receive power (voltage) for their operation from the Computer System. The USB Protection Device may be operative to ensure that any type of data that tries to leak from the Computer System through the power lines (for example by being modulated on the supply voltage that is provided to the Peripheral Product), is blocked.

Alternatively or in addition, by continuously measuring the consumed power that the Peripheral Product is drawing through the USB Protection Device, the USB Protection Device may provide indications that the Peripheral Product is not performing only its intended/innocent function (a computer mouse for example), but also some other suspicious or insecure activity as wirelessly transmitting).

Any suitable criteria and/or rules and/or thresholds may be employed to differentiate ti malevolent peripheral device activity from innocent peripheral device activity, including predetermined logic and learned rules. For example, malevolent activity may be detected by a level of power consumption that exceeds an "expected" power consumption level of the device.

Predetermined logic may for example be configured to alert that a keyboard is drawing a lamp current since this level of current is clearly deviant and suggests the keyboard may be leaking something to the outside.

Alternatively or in addition, an increase in power consumption that is not related to user activity may for example be flagged since it may be assumed that transmission will not be present at all times.

Higher current may be interpreted as meaning higher than what is consumed during normal mouse operation, or any power peaks. According to certain embodiments, power peaks occurring at hours during which little or no activity is expected e.g. off-office hours, are particularly suspect.

A suitable learning phase may be provided, e.g. to establish a power baseline, based on current values and known thresholds. During a training period, data readout from the actual device may be employed, or a pre-set "power behaviour model" may be provided for specific equipment, since it may be assumed that the power consumption of all keyboards (say) distributed by vendor x under catalog number y, behave similarly in terms of their power consumption e.g. have a known range of power levels when they are being used.

The power supply module generates an independent clean and isolated voltage source that is used for feeding the peripheral product. The power supply module within the USB protection device typically comprises completely floating and isolated power circuitry e.g. with no galvanic connection between the power source driving the power supply and the power devices that use the power supply outputs, rendering it impossible for the computer system to ex-filtrate data by modulating the data on the power lines that go towards the peripheral product.

Figure 9:
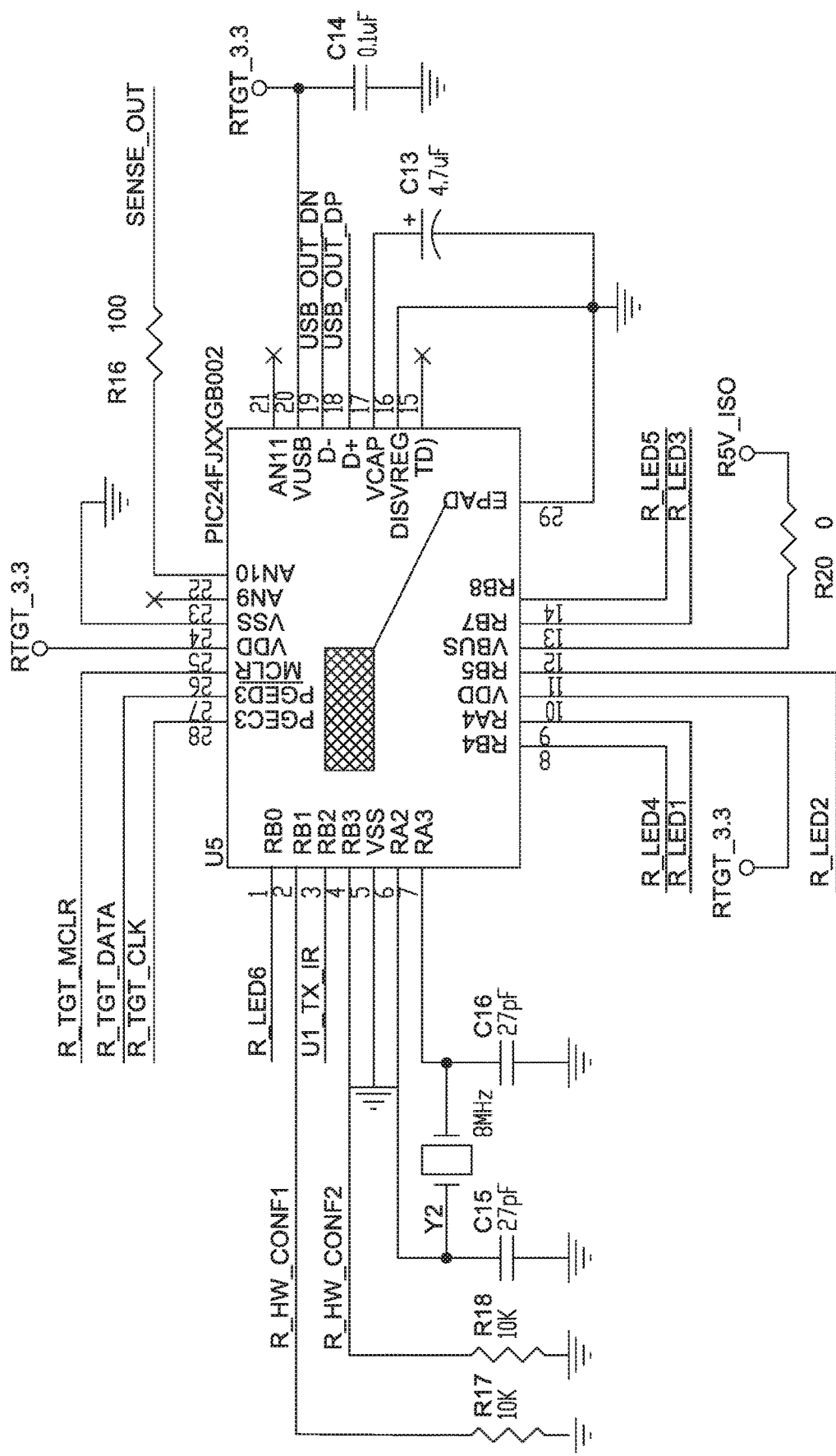
FIG. 9 is a schematic illustration of an example detailed implementation of the far-side CPU e.g. CPU 2 of FIGS. 1 and 2 (passive connectors omitted for simplicity).

The power supply may be built of discrete components, or using an integrated device that provides an entire isolated/floating dc/dc converter functionality, such as, for example, the nxe1s0505mr-r7. An example implementation is illustrated in FIG. 9.

High side (above-high-threshold) and/or low side (below-low-threshold) current measurements may be implemented so that the CPU may read and analyze the momentary current drawn from the DC/DC converter, for abnormal current levels.

According to certain embodiments, a Behavioral Analysis Algorithm may be provided.

The USB Protection Device when installed between the Computer System and the Peripheral Product, has complete and full visibility of the information that passes through, and of the behavior of both the Computer System as well as the Peripheral Product.

As such, the USB Protection Device may deploy specific behavioral analysis algorithm/s as part of its firmware in order to identify and detect abnormal operation of either the Computer System, the Peripheral Product, or even the human user/operator that uses the Peripheral Product in order to control the Computer System.

The algorithm may reside in any suitable locations e.g. in CPU 2, for the input path. The algorithm may run in CPU 1 for the output path or alternatively, in the output path, the computer resources may be used to run the behavioral analysis algorithm, unless there is concern regarding the computer resources being more at risk compared with the USB device shown an described herein.

Example 1

When securing the connection between a keyboard (as the Peripheral Product) and a PC (as the Computer System) the USB Protection Device keeps track of timing parameters of various sets of keystrokes and runs an analysis against previous behavior patterns.

While typing his password (or almost any other word or sequence of characters), any user has his unique "fingerprint" characterized e.g. by the time difference between each character and the next character.

A hostile or attacking device that may "playback" pre-defined known keystroke patterns (for example, trying to use a password that has been stolen), will have a different timing profile that may be detected and blocked by the USB Protection Device.

Example 2

When securing the connection between a POS (Point Of Sale) cash register and a USB bill printer, it may be desired to ensure that the Computer System (cash register) is only sending data to be printed on the bill paper, and not other or different information, such as ex-filtrated credit card numbers that could be transmitted by a hostile wireless transmitter that is implanted in the printer. In this example, the USB Protection Device acts as a virtual bill printer towards the cash register, and as a virtual cash register towards the real printer. The USB Protection Device may examine each piece of information that is sent through towards the printer, and activate a suitable rule base which may be pre-stored in computer memory, ensuring that the structure and content of data are logical and legal.

An example of a suitable rule is that a cash register detected trying to print too many characters without stopping (or, more generally, any output peripheral exhibiting an overflow of data being transmitted outward), could indicate an attempt to ex-filtrate information through the cash register, printer or other peripheral output device.

Another possible "rule" is that "to be printed" information may normally have a known appearance (e.g. receipts with a known appearance or prototype or format or template, email notifications with a standard format, etc.) and so, if "to be printed" information diverges from the known appearance, this could indicate that the cash register or other peripheral output device is trying to export sensitive information that may be picked up by someone standing by. According to certain embodiments, "look and feel" features may be downloaded to the dongle or apparatus shown and described herein, and used as a template of what data is and/or is not expected to be printed.

Figure 4:
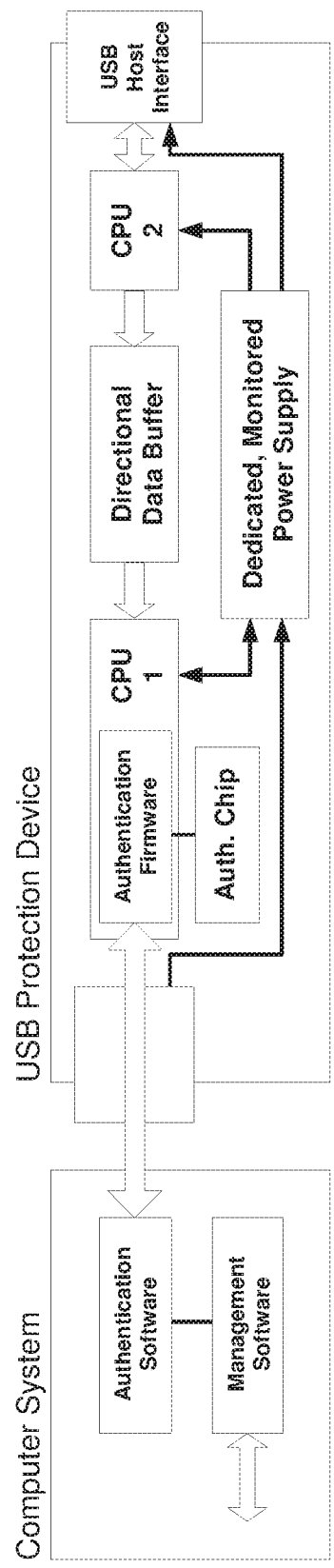
FIG. 4 is a simplified block diagram illustration of a USB Protection Device which may be similar to that of FIG. 1 but also providing Removal/Replacement detection functionality, in accordance with certain embodiments.

Authentication and Removal Protection may be provided e.g. as per the embodiment of FIG. 4. The USB Protection Device shown and described herein may physically be inserted in a transparent manner between the Computer System and the Peripheral Product. Therefore, extra care and caution are typically taken to ensure that the USB Protection Device shown and described herein is not removed and/or replaced with a transparent/dummy adaptor that is completely ineffective, and therefore compromises system security.

A dedicated authentication module may be implemented typically as part of firmware that is running on CPU 1 (the CPU "near" the computer system as opposed to CPU 2 which is near the Peripheral Product). The CPU 1 firmware may also be operative to provide the USB bidirectional functionality and/or to monitor power behaviour e.g. as described herein. A complementary software module is running on the Computer System and constantly e.g. periodically, or repeatedly, or on occasion, ensures not only that the USB Protection Device is still present, but also authenticates the USB Protection Device e.g. using a conventional Authentication Chip incorporated in the USB Protection Device e.g. as shown in FIG. 4.

It is appreciated that any suitable crypto-chip, such as but not limited to the sh204a device used in the embodiment of FIGS. 8a-8d, may be used in conjunction with a suitable conventional authentication scheme to verify the device's authentication level using a unique key. For example, a "pairing" sequence with a protocol known to both sides may be used in which a specific the computer system "accepts" a specific USB protection device.

In the event that the Authentication Software on the Computer System detects that the USB Protection Device is not present or has been replaced, the Authentication Software on the Computer System may be configured to:
i. use the Management Software (such as the Client part of an Endpoint Security software package, or the Agent part of a Desktop Management Software suite) to alert the user or system administrator about this security incident, and/or
ii. automatically disable the USB port to which the IJSB protection device is connected, to ensure no infection can be transmitted. Conventional operating system device disabling may be employed for this purpose, and is typically reversible by an overriding action on the part of the system administrator, who holds the highest security permissions and confidence level.

Figure 5:
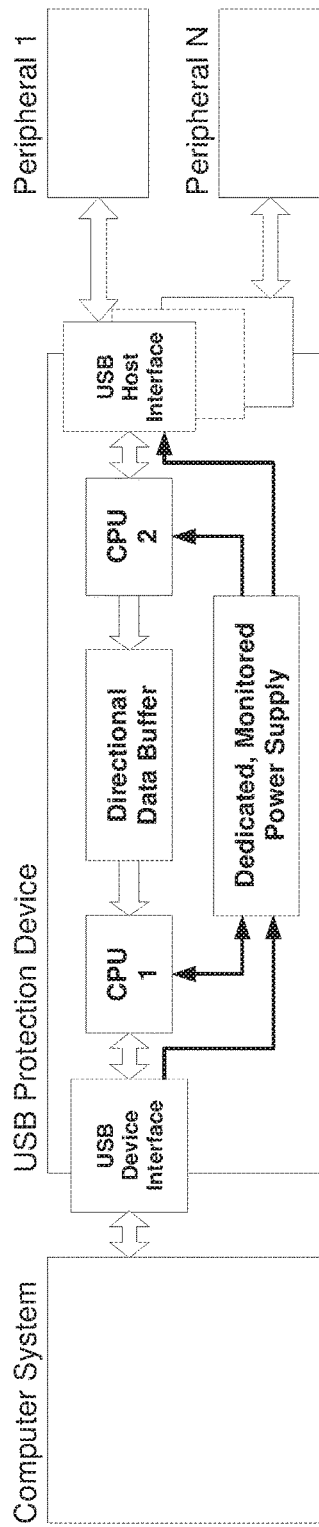
FIG. 5 is a simplified block diagram illustration of a USB Protection Device which may be similar to that of FIG. 1 but also providing Multiple Peripheral Support, in accordance with certain embodiments.

Multiple Peripheral Product Support e.g. as per the embodiment of FIG. 5, may be provided. As appropriate, a USB Protection Device with several USB Host interfaces may be used for connecting more than one Peripheral Product to the same IJSB port of the Computer System e.g. as shown in FIG. 5.

Figure 6:
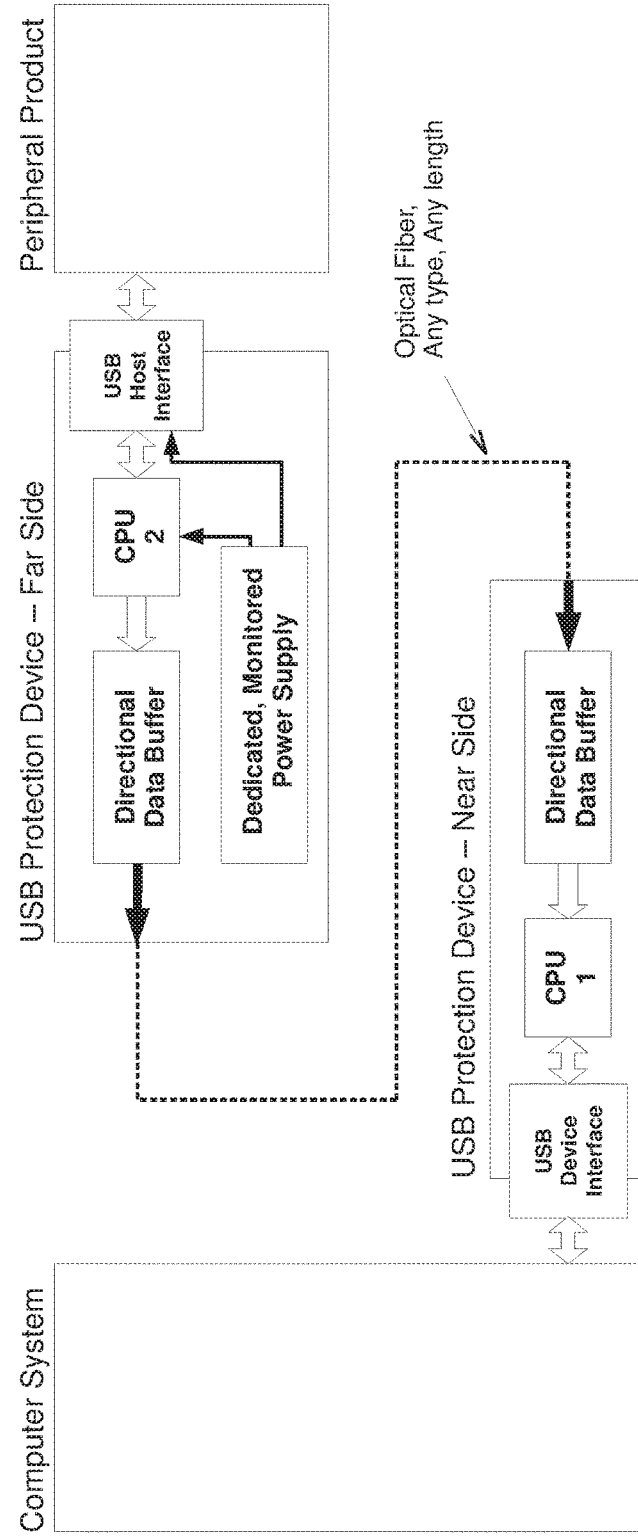
FIG. 6 is a simplified block diagram illustration of a USB Protection Device which may be a variant of FIG. 1 characterized by Distributed rather than centralized Deployment, in accordance with certain embodiments.

Distributed Deployment e.g. as per the embodiment of FIG. 6, may be provided.

In some cases, the Peripheral Product may be physically located far from the Computer System. An example may be in a large meeting room when a keyboard on the meeting table is several meters away from the Computer System.

Another example could be a remote emergency button that is installed in a transportation tunnel that is kilometers away from the Computer System and is connected through an optical fiber. For this kind of installation, a distributed USB Protection Device may be used, where the near and far end portions are separated, and an optical fiber may be employed to interconnect the near and far-end portions (e.g. to provide a data connection between the uni-directional data buffers of the 2 ends) while still keeping the communication strictly uni-directional on the hardware/physical layer e.g. as shown in FIG. 6.

Figure 7:
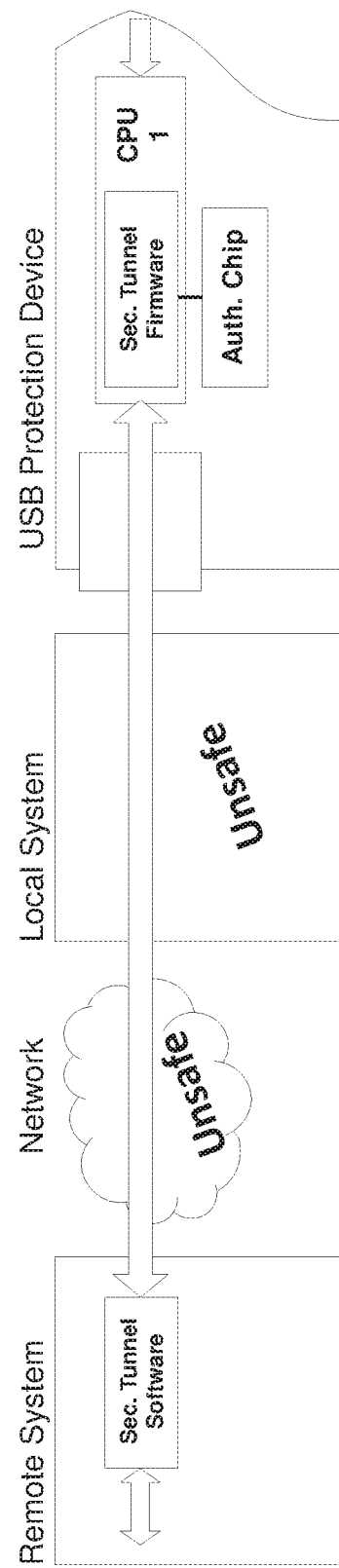
FIG. 7 is a simplified block diagram illustration of a USB Protection Device which may be similar to that of FIG. 1 but also providing a Secured Communication Tunnel, in accordance with certain embodiments. It is appreciated that the embodiments shown above may be combined in any suitable manner, either for the FIG. 1 variant or for the FIG. 2 variant. For example, a single embodiment may combine the FIG. 1 or 2 variant, with the embodiment of FIG. 4 and/or of FIG. 5 and/or of FIG. 6 and/or of FIG. 7.
Figure 8A:
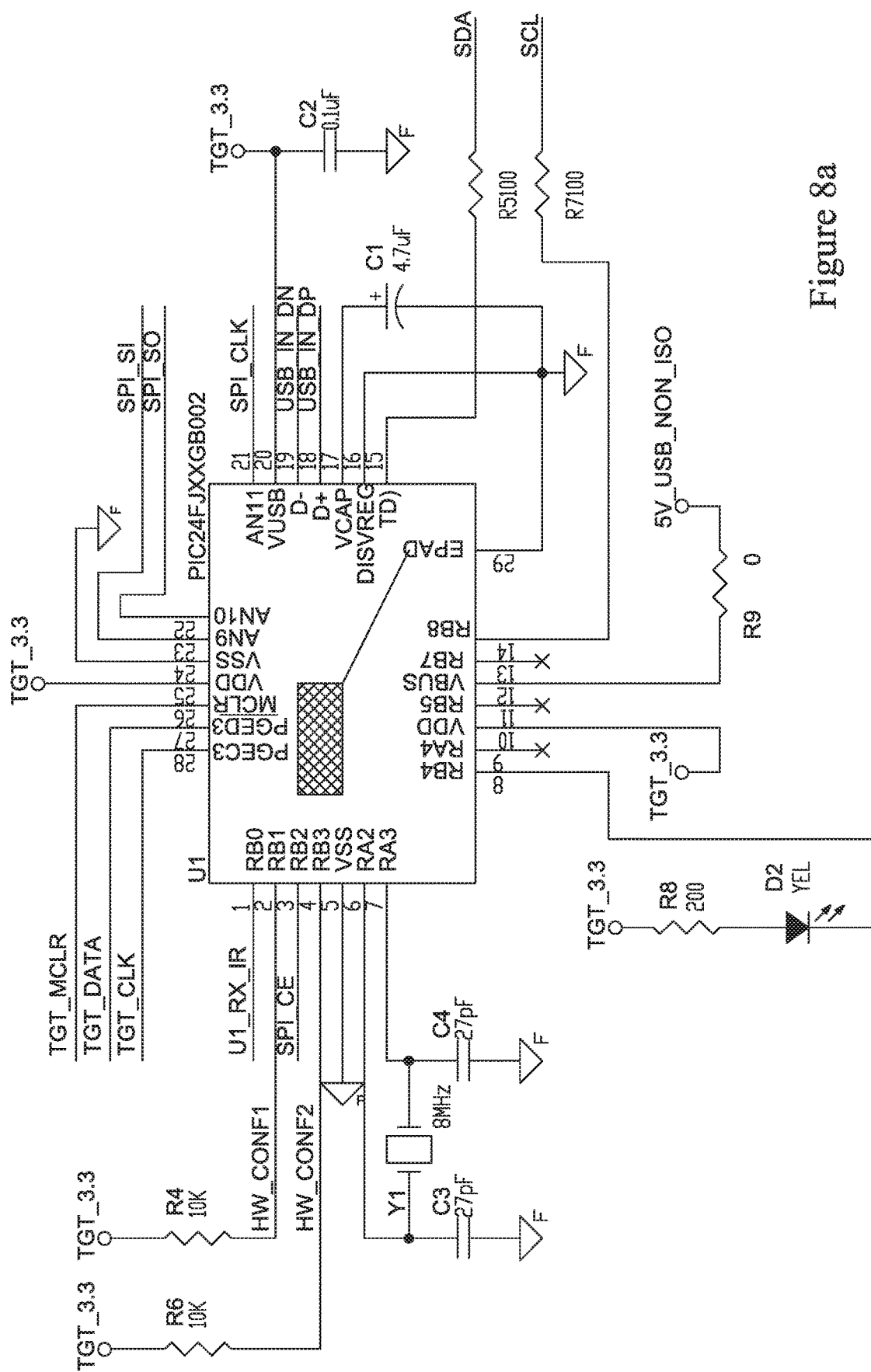
FIGS. 8*a*-8*d*, taken together, form an example detailed implementation of the near-side CPU e.g. CPU 1 of FIGS. 1 and 2 (passive connectors omitted for simplicity).
Figure 8C:
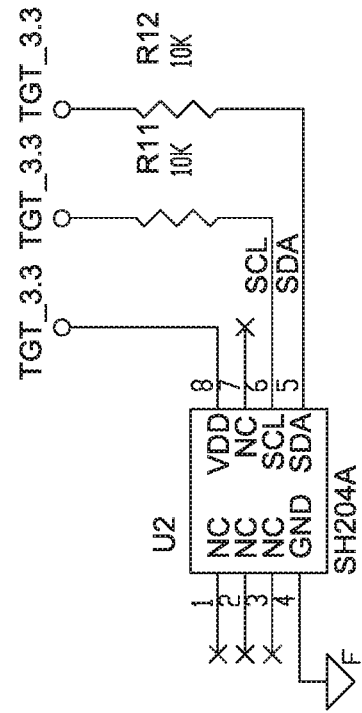
Figure 8D:
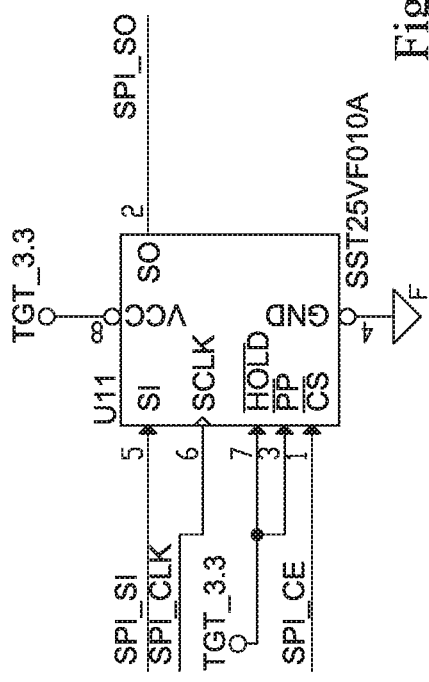
Figure 8B:
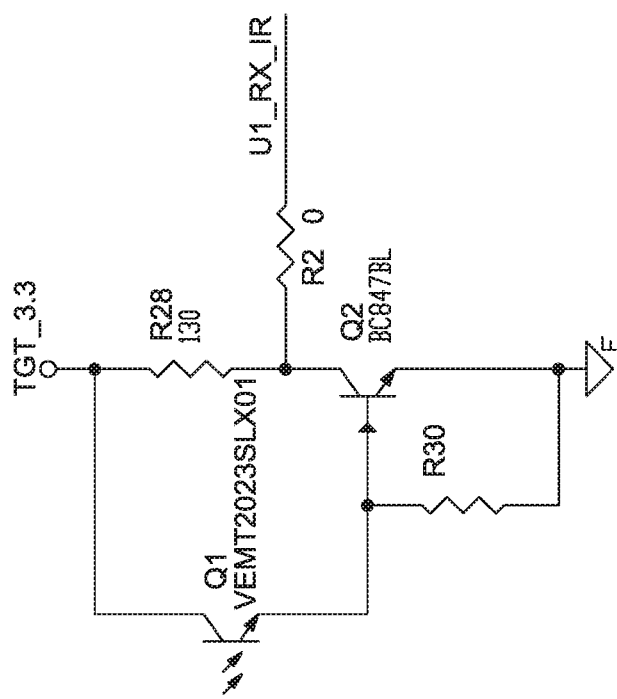

Secured Tunnel e.g. as per the embodiment of FIG. 7, may be provided.

Tunneling aka transparency mode, is a known functionality which involves encryption and which regenerates and forwards data to another point.

Another application of the USB Protection Device may be a use-case in which it is desired to transfer sensitive information, such as a credit card number or a password, through an unsafe local Computer System and across an insecure network.

As all data coming from the USB device (in this example a USB keyboard or a magnetic card reader) passes through the USP Protection Device, the USB Protection Device may encrypt (e.g. may include tunnel firmware operative to encrypt) the sensitive information so that the data enters the local Computer System and is transmitted over the network without being readable. The only location where this data is decrypted is within the remote Computer System that is safe and secured, e.g. as shown in FIG. 7.

A typical example of such a deployment is in a retail environment (fast food restaurant cash register for example) when, even if the cash register computer (the local Computer System in this case), is compromised and infected, or the network is hacked or tampered with, credit card information cannot be stolen because it is "not visible" within this Computer System.

The safe place where credit card information is decrypted and thus becomes "visible" again is only within the server at the secure data center environment (in this case the remote Computer System).

It is appreciated that terminology such as "mandatory", "required", "need" and "must" refer to implementation choices made within the context of a particular implementation or application described herewithin for clarity and are not intended to be limiting since in an alternative implantation, the same elements might be defined as not mandatory and not required or might even be eliminated altogether.

Components described herein as software may, alternatively, be implemented wholly or partly in hardware and/or firmware, if desired, using conventional techniques, and vice-versa. Each module or component or processor may be centralized in a single physical location or physical device or distributed over several physical locations or physical devices.

Included in the scope of the present disclosure, inter alia, are electromagnetic signals in accordance with the description herein. These may carry computer-readable instructions for performing any or all of the operations of any of the methods shown and described herein, in any suitable order including simultaneous performance of suitable groups of operations as appropriate; machine-readable instructions for performing any or all of the operations of any of the methods shown and described herein, in any suitable order; program storage devices readable by machine, tangibly embodying a program of instructions executable by the machine to perform any or all of the operations of any of the methods shown and described herein, in any suitable order i.e. not necessarily as shown, including performing various operations in parallel or concurrently rather than sequentially as shown; a computer program product comprising a computer useable medium having computer readable program code, such as executable code, having embodied therein, and/or including computer readable program code for performing, any or all of the operations of any of the methods shown and described herein, in any suitable order; any technical effects brought about by any or all of the operations of any of the methods shown and described herein, when performed in any suitable order; any suitable apparatus or device or combination of such, programmed to perform, alone or in combination, any or all of the operations of any of the methods shown and described herein, in any suitable order; electronic devices each including at least one processor and/or cooperating input device and/or output device and operative to perform e.g. in software any operations shown and described herein; information storage devices or physical records, such as disks or hard drives, causing at least one computer or other device to be configured so as to carry out any or all of the operations of any of the methods shown and described herein, in any suitable order; at least one program pre-stored e.g. in memory or on an information network such as the Internet, before or after being downloaded, which embodies any or all of the operations of any of the methods shown and described herein, in any suitable order, and the method of uploading or downloading such, and a system including server/s and/or client's for using such; at least one processor configured to perform any combination of the described operations or to execute any combination of the described modules; and hardware which performs any or all of the operations of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any operation or functionality described herein may be wholly or partially computer-implemented e.g. by one or more processors. The invention shown and described herein may include (a) using a computerized method to identify a solution to any of the problems or for any of the objectives described herein, the solution optionally include at least one of a decision, an action, a product, a service or any other information described herein that impacts, in a positive manner, a problem or objectives described herein; and (b) outputting the solution.

The system may if desired be implemented as a web-based system employing software, computers, routers and telecommunications equipment as appropriate.

Any suitable deployment may be employed to provide functionalities e.g. software functionalities shown and described herein. For example, a server may store certain applications, for download to clients, which are executed at the client side, the server side serving only as a storehouse. Some or all functionalities e.g. software functionalities shown and described herein may be deployed in a cloud environment. Clients e.g. mobile communication devices such as smartphones may be operatively associated with but external to the cloud.

The scope of the present invention is not limited to structures and functions specifically described herein and is also intended to include devices which have the capacity to yield a structure, or perform a function, described herein, such that even though users of the device may not use the capacity, they are, if they so desire, able to modify the device to obtain the structure or function.

Features of the present invention, including operations, which are described in the context of separate embodiments may also be provided in combination in a single embodiment. For example, a system embodiment is intended to include a corresponding process embodiment and vice versa. Also, each system embodiment is intended to include a server-centered "view" or client centered "view", or "view" from any other node of the system, of the entire functionality of the system, computer-readable medium, apparatus, including only those functionalities performed at that server or client or node. Features may also be combined with features known in the art, and particularly, although not limited to, those described in the Background section or in publications mentioned therein.

Conversely, features of the invention, including operations, which are described for brevity in the context of a single embodiment or in a certain order may be provided separately or in any suitable subcombination, including with features known in the art (particularly, although not limited to, those described in the Background section or in publications mentioned therein) or in a different order. "e.g." is used herein in the sense of a specific example which is not intended to be limiting. Each method may comprise some or all of the operations illustrated or described, suitably ordered e.g. as illustrated or described herein.

Devices, apparatus or systems shown coupled in any of the drawings may in fact be integrated into a single platform in certain embodiments or may be coupled via any appropriate wired or wireless coupling such as but not limited to optical fiber, Ethernet, Wireless LAN, HomePNA, power line communication, cell phone, Smart Phone (e.g. iPhone), Tablet, Laptop, PDA, Blackberry GPRS, Satellite including GPS, or other mobile delivery. It is appreciated that in the description and drawings shown and described herein, functionalities described or illustrated as systems and sub-units thereof can also be provided as methods and operations therewithin, and functionalities described or illustrated as methods and operations therewithin can also be provided as systems and sub-units thereof. The scale used to illustrate various elements in the drawings is merely exemplary and/or appropriate for clarity of presentation and is not intended to be limiting.

The invention claimed is:

1. A system for protecting a Computer System interfacing with peripheral elements via a generic port associated with an open standard interface, the system comprising:
    at least one Protection Device configured to be installed between the Computer System and Peripheral element/s of the Computer System and including:
        a pair of computer-peripheral interfaces including a "near end" interface and a "far-end" interface; and
        a uni-directional data flow limiter intermediate the computer-peripheral interfaces, and the uni-directional data flow limiter is configured to protect the computer system from an abnormality flowing from the computer-peripheral interfaces by invoking an individual one of a following two states which each ensure that data flows only in one direction:
            a state which ensures that data flows only outward; or
            a state which ensures that data flows only inward.

2. A system according to claim 1 and also comprising a first CPU configured to interface with the "near end" interface and to act as a virtual peripheral element.

3. A system according to claim 1 and also comprising a second CPU configured to interface with the "far-end" USB interfaces and to act as a virtual computer system.

4. A system according to claim 1 and also comprising first and second CPUs configured to interface with the "near end" interface and "far-end" USB interfaces respectively and to act as a virtual peripheral element and a virtual computer system, respectively, and wherein the uni-directional data flow limiter is disposed intermediate the first and second CPUs.

5. A system according to claim 4 wherein authentication firmware resides on the first CPU.

6. A system according to claim 4 wherein security tunnel firmware resides on the first CPU.

7. A system according to claim 1 and also comprising a dedicated power supply that feeds at least one peripheral element and is monitored to provide an indication for at least one manipulated device/attack.

8. A system according to claim 1 and also comprising behavioral analysis functionality configured to receive data flowing between computer and peripheral and to provide an indication for at least one manipulated device/attack.

9. A system according to claim 1 wherein the hardware based uni-directional data flow limiter is permanently configured to invoke only one of two states each ensuring that data flows only in one direction, i.e. either only out or only in.

10. A system according to claim 1 wherein the hardware based uni-directional data flow limiter invokes an input only state and is used in conjunction with a USB port, which protects the computer system against data leakage, while an input oriented peripheral is communicating with the USB port.

11. A system according to claim 1 wherein the hardware based uni-directional data flow limiter invokes an Output Only state and is used in conjunction with a USB port exporting data from the computer which ensures that the computer is detached from any external device or entity that could "push" harmful data or files inwards.

12. A system according to claim 1 wherein the Protection Device is operative to undergo training e.g. using supervised machine learning technology, in which users' profiles are learned, and accordingly, to detect a profile for each device trying to use a password, e.g. hostile or attacking device, that can "playback" predefined known keystroke patterns, and to compare said profile to a known profile for the user who owns the password.

13. A system according to claim 12 and wherein said profile comprises a unique user "fingerprint" characterized by the time difference between each character and the next character when the user types her or his password (or almost any other word or sequence of characters).

14. A system according to claim 1 wherein, if Authentication Software on the Computer System detects that the Protection Device is not present, the Authentication Software uses management Software on the Computer System to alert at least one of the user and the system administrator.

15. A system according to claim 1 wherein, if Authentication Software on the Computer System detects that the Protection Device has been replaced, the Authentication Software uses management Software on the Computer System to alert at least one of the user and the system administrator.

16. A system according to claim 1 wherein, if Authentication Software on the Computer System detects that the Protection Device is not present, the Authentication Software uses management Software on the Computer System to automatically disable said port to ensure no infection can come through.

17. A system according to claim 1 wherein, if Authentication Software on the Computer System detects that the Protection Device has been replaced, the Authentication Software uses management Software on the Computer System to automatically disable said port to ensure no infection can come through.

18. A system according to claim 1 wherein plural host interfaces are used for connecting plural Peripheral Products to the Computer System via said port e.g. via a single port.

19. A system according to claim 1 wherein said Protection Device comprises a distributed device with separate near end and far end portions connected by a single optical fiber while maintaining communications uni-directional on the hardware/physical layer.

20. A data security method comprising:

Providing a pair of computer-peripheral interfaces including first and second computer-peripheral interfaces with data communication between the first and second computer-peripheral interfaces;

Providing a power supply operative to supply power to a peripheral connected to one of the interfaces; and Monitoring current usage by sampling current drawn from the power supply and to detect abnormal patterns in the peripheral's current usage and, responsively, to disable data communication between the pair of interfaces, wherein:

said peripheral serves a computer system, and said power supply provided by said method is dedicated to generating an independent supply voltage for feeding said peripheral rather than having said peripheral receive power for operation of said peripheral from the computer system.

\* \* \* \* \*